(12) United States Patent
Celler

(10) Patent No.: US 9,250,500 B2
(45) Date of Patent: *Feb. 2, 2016

(54) ARTICULATING CAMERA ARM AND CAMERA ASSEMBLY COMPRISING SAME

(71) Applicant: Avigilon Corporation, Vancouver (CA)

(72) Inventor: Piotr Zbigniew Celler, Vancouver (CA)

(73) Assignee: Avigilon Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/634,552

(22) Filed: Feb. 27, 2015

(65) Prior Publication Data

US 2015/0198867 A1    Jul. 16, 2015

Related U.S. Application Data

(63) Continuation of application No. 14/155,197, filed on Jan. 14, 2014, now Pat. No. 8,998,512.

(51) Int. Cl.
*G03B 17/56* (2006.01)
*F16M 11/10* (2006.01)
*F16M 11/20* (2006.01)
*F16M 13/02* (2006.01)

(52) U.S. Cl.
CPC ............ *G03B 17/561* (2013.01); *F16M 11/105* (2013.01); *F16M 11/2057* (2013.01); *F16M 13/02* (2013.01)

(58) Field of Classification Search
CPC ..................................................... G03B 17/561
See application file for complete search history.

(56) References Cited

U.S. PATENT DOCUMENTS

| | | |
|---|---|---|
| 5,790,910 A | 8/1998 | Haskin |
| 5,929,910 A | 7/1999 | Kim et al. |
| 6,008,846 A | 12/1999 | Uehara et al. |
| 7,599,000 B2 | 10/2009 | Lai |
| 7,927,027 B2 | 4/2011 | Yamakose et al. |
| 8,998,512 B1 * | 4/2015 | Celler ........................ 396/427 |
| 2008/0226282 A1 | 9/2008 | Takahashi |
| 2009/0002548 A1 | 1/2009 | Liang et al. |
| 2011/0102587 A1 | 5/2011 | Zittel |

OTHER PUBLICATIONS

Office action dated Jun. 26, 2014, issued by the United States Patent and Trademark Office in related U.S. Appl. No. 14/155,179, filed Jan. 14, 2014, for which a Notice of Allowance issued on Nov. 28, 2014.

\* cited by examiner

*Primary Examiner* — WB Perkey
(74) *Attorney, Agent, or Firm* — Klarquist Sparkman, LLP

(57) ABSTRACT

An articulating camera arm permits a camera to be positioned includes multiple sections connected together in series at joints. At least one of the joints is movable, and each of the joints connects one of the sections to an immediately preceding one of the sections. The articulating arm may also be connected to one or both of a camera and a mounting plate via movable joints such as swivel joints. The arm's interior includes a wiring conduit that allows wiring for the camera to pass through it while being protected by the arm.

22 Claims, 20 Drawing Sheets

ARTICULATING CAMERA ARM AND CAMERA ASSEMBLY COMPRISING SAME

CROSS REFERENCE TO RELATED APPLICATION

This application is a Continuation of U.S. patent application Ser. No. 14/155,197, entitled ARTICULATING CAMERA ARM AND CAMERA ASSEMBLY COMPRISING SAME, filed on Jan. 14, 2014.

TECHNICAL FIELD

The present disclosure is directed at an articulating camera arm and a camera assembly comprising the articulating camera arm.

BACKGROUND

A surveillance camera is typically positioned so that it is able to record actions occurring in a region of interest. The manner in which the camera's position is adjusted may vary with the type of camera and the nature of the installation. For example, the position of a dome camera that is mounted flush against a ceiling may be adjusted by rotating the dome camera against the ceiling, while the position of a bullet camera that is connected to an arm mounted to a wall may be adjusted by moving the arm. Regardless of the nature of the installation or type of camera, the camera's position is typically adjusted by a technician when installing the camera and from time to time during the life of the camera.

SUMMARY

According to a first aspect, there is provided a camera assembly, comprising a mounting plate; a camera body; and an articulating arm comprising multiple sections coupled together in series at joints of which at least one is movable, wherein each of the joints couples one of the sections to an immediately preceding one of the sections, a first end of a first of the sections ("mounting section") is coupled to the mounting plate at a movable mounting joint, and a second end of a last of the sections ("camera section") is coupled to the camera body at a movable camera joint, and wherein interiors of the sections collectively comprise a wiring conduit extending through the interior of the articulating arm permitting wire to pass from the camera body to the mounting plate while entirely contained within the articulating arm.

All of the joints may be movable.

The mounting joint may comprise a mounting swivel joint and the camera joint may comprise a camera swivel joint, and the mounting and camera sections may be directly and pivotably coupled to each other.

The mounting swivel joint may comprise a cylindrical first female portion comprising part of one of the mounting section and mounting plate; and a cylindrical first male portion, nested within the first female portion, extending from the other of the mounting section and mounting plate. The camera swivel joint may comprise a cylindrical second female portion comprising part of one of the camera section and camera body; and a cylindrical second male portion, nested within the second female portion, extending from the other of the camera section and camera body.

The wiring conduit may extend through the interior of the cylindrical first and second male portions.

The mounting section may comprise a short mounting half and a long mounting half that overhangs the short mounting half, the mounting halves having opposing concave sides and connected along their longitudinally extending edges, wherein the camera section comprises a short camera half and a long camera half that overhangs the short camera half, the camera halves having opposing concave sides and connected along their longitudinally extending edges, and wherein overhanging portions of the long mounting and camera halves overlap each other.

The wiring conduit may extend through the overhanging portions of the long mounting and camera halves.

The camera assembly may further comprise a hinge joint joining the camera and mounting halves that extends through the overhanging portions of the long mounting and camera halves.

The hinge joint may comprise a rod formed from an aligned pair of rod segments, one of which extends from the long mounting half and the other of which extends from the long camera half; and a screw that is screwed into the rod.

Ends of the long mounting and camera halves nearest the hinge joint may each comprise a convex portion to permit pivoting of the camera section relative to the mounting section.

Ends of the short mounting and camera halves may each comprise a linear portion extending transverse to the longitudinal axis of the articulating arm and a concave portion shaped to receive the convex portions of the long camera and mounting halves, respectively, to permit asymmetrical pivoting of the camera section relative to the mounting section.

One of the overhanging portions of the long mounting and camera halves may comprise teeth that contact the other of the overhanging portions.

According to another aspect, there is provided an articulating arm for mounting a camera to a mounting surface, the arm comprising multiple sections coupled together in series at joints of which at least one is movable, wherein each of the joints couples one of the sections to an immediately preceding one of the sections, and wherein a first end of a first of the sections ("mounting section") comprises a male or female portion of a mounting swivel joint; a second end of a last of the sections ("camera section") comprises a male or female portion of a camera swivel joint; and interiors of the sections collectively comprise a wiring conduit extending through the interior of the articulating arm permitting wire to pass from the second end of the camera section to the first end of the mounting section while entirely contained within the articulating arm.

All the joints may be movable.

The mounting and camera sections may be directly and pivotably coupled to each other.

The mounting section may comprise a short mounting half and a long mounting half that overhangs the short mounting half, the mounting halves having opposing concave sides and connected along their longitudinally extending edges, wherein the camera section comprises a short camera half and a long camera half that overhangs the short camera half, the camera halves having opposing concave sides and connected along their longitudinally extending edges, and wherein overhanging portions of the long mounting and camera halves overlap each other.

The wiring conduit may extend through the overhanging portions of the long mounting and camera halves.

One of the overhanging portions of the long mounting and camera halves may comprise teeth that contact the other of the overhanging portions.

The arm may further comprise a hinge joint joining the camera and mounting halves that extends through the overhanging portions of the long mounting and camera halves.

The hinge joint may comprise a rod formed from an aligned pair of rod segments, one of which extends from the long mounting half and the other of which extends from the long camera half; and a screw that is screwed into the rod.

Ends of the long mounting and camera halves nearest the hinge joint may each comprise a convex portion to permit pivoting of the camera section relative to the mounting section.

Ends of the short mounting and camera halves may each comprise a linear portion extending transverse to the longitudinal axis of the articulating arm and a concave portion shaped to receive the convex portions of the long camera and mounting halves, respectively, to permit asymmetrical pivoting of the camera section relative to the mounting section.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1A:
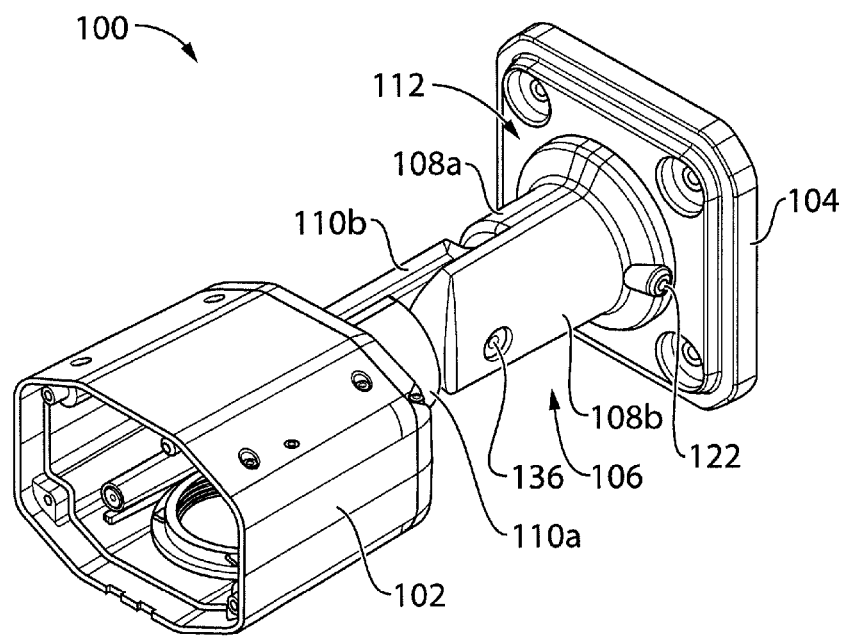
FIG. 1A is a perspective view of a camera assembly comprising a camera body, an articulating arm, and a mounting plate, according to one embodiment.
Figure 1B:
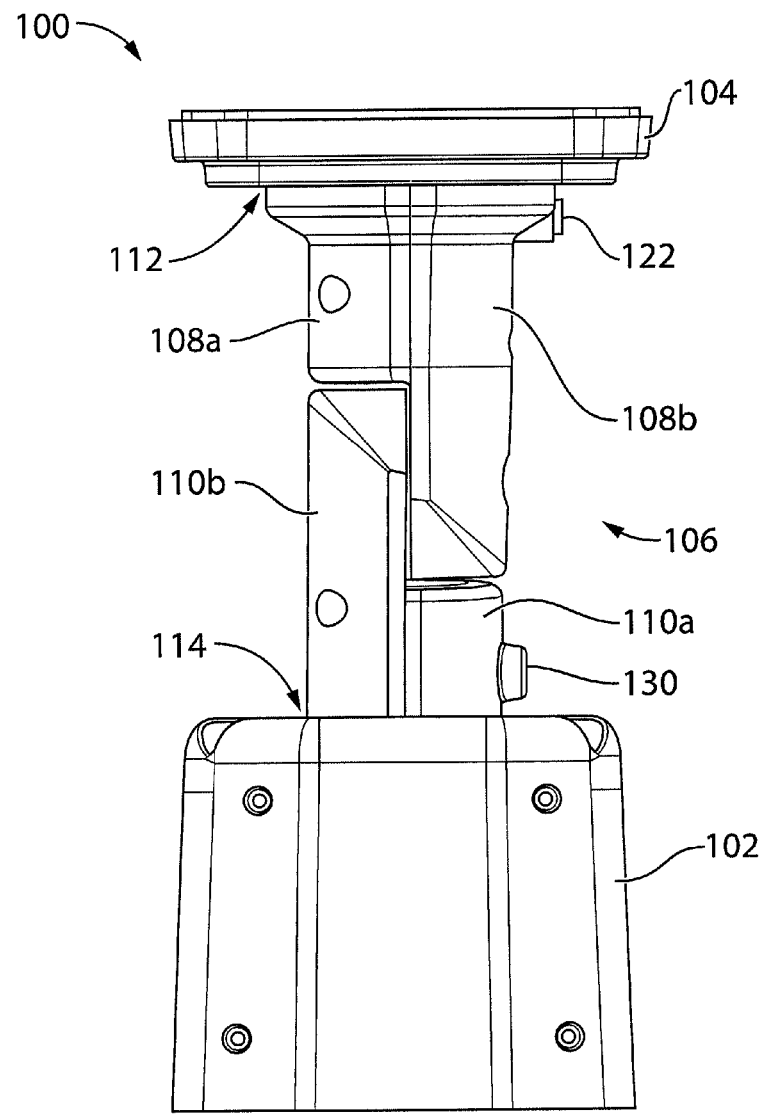
FIG. 1B is a top plan view of the camera assembly.
Figure 1C:
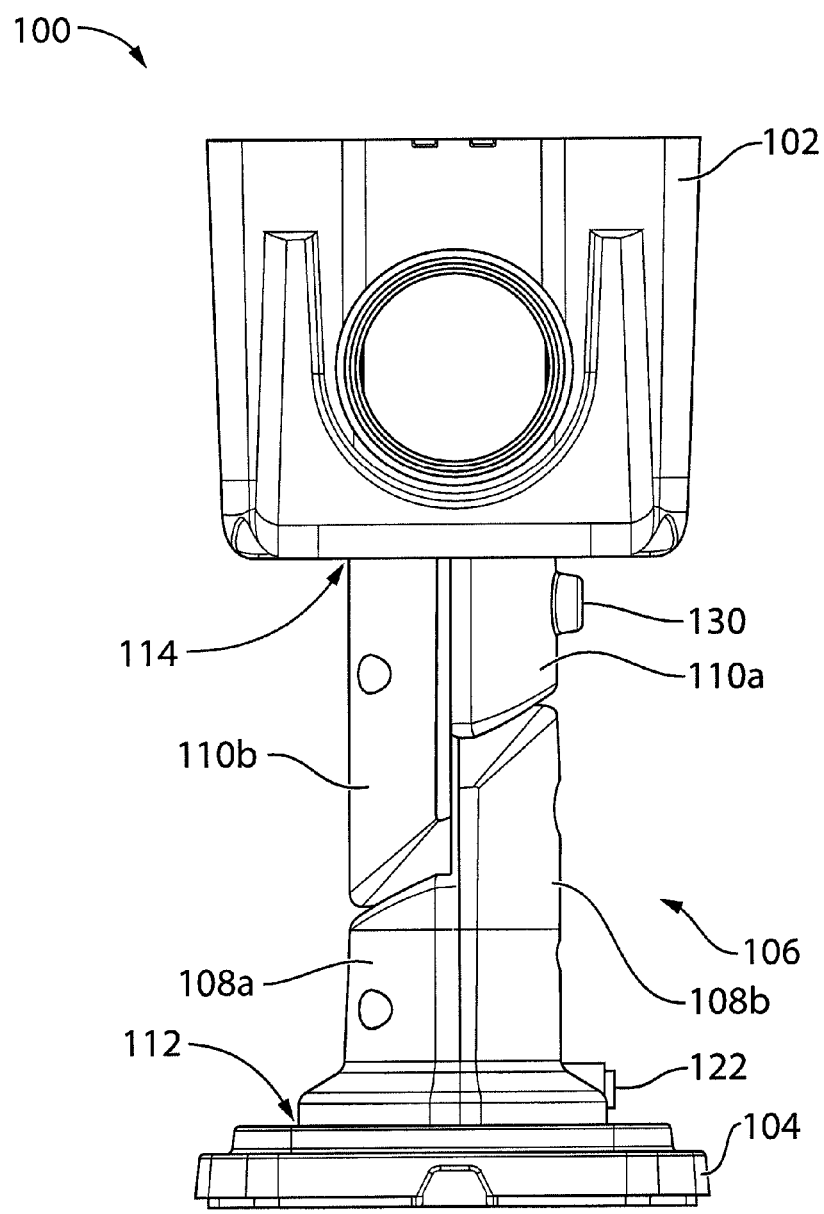
FIG. 1C is a bottom plan view of the camera assembly.
Figure 1D:
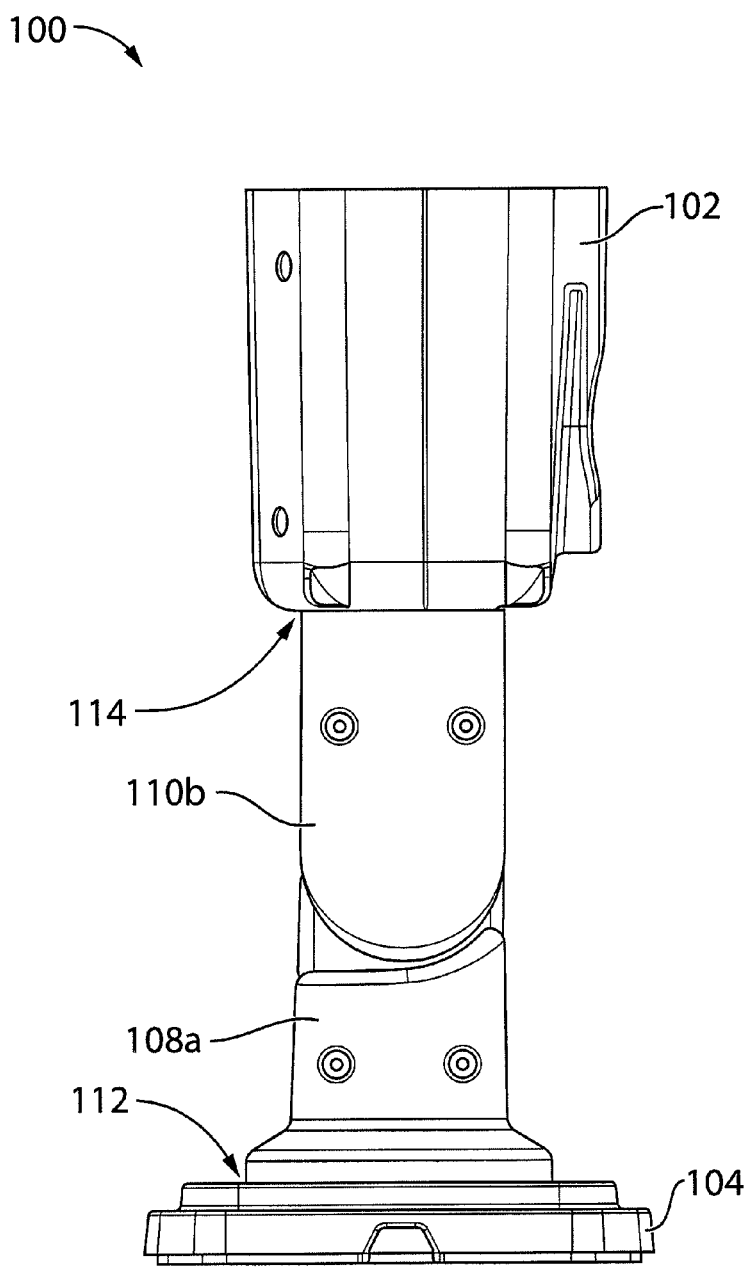
FIG. 1D is a left side elevation view of the camera assembly.
Figure 1E:
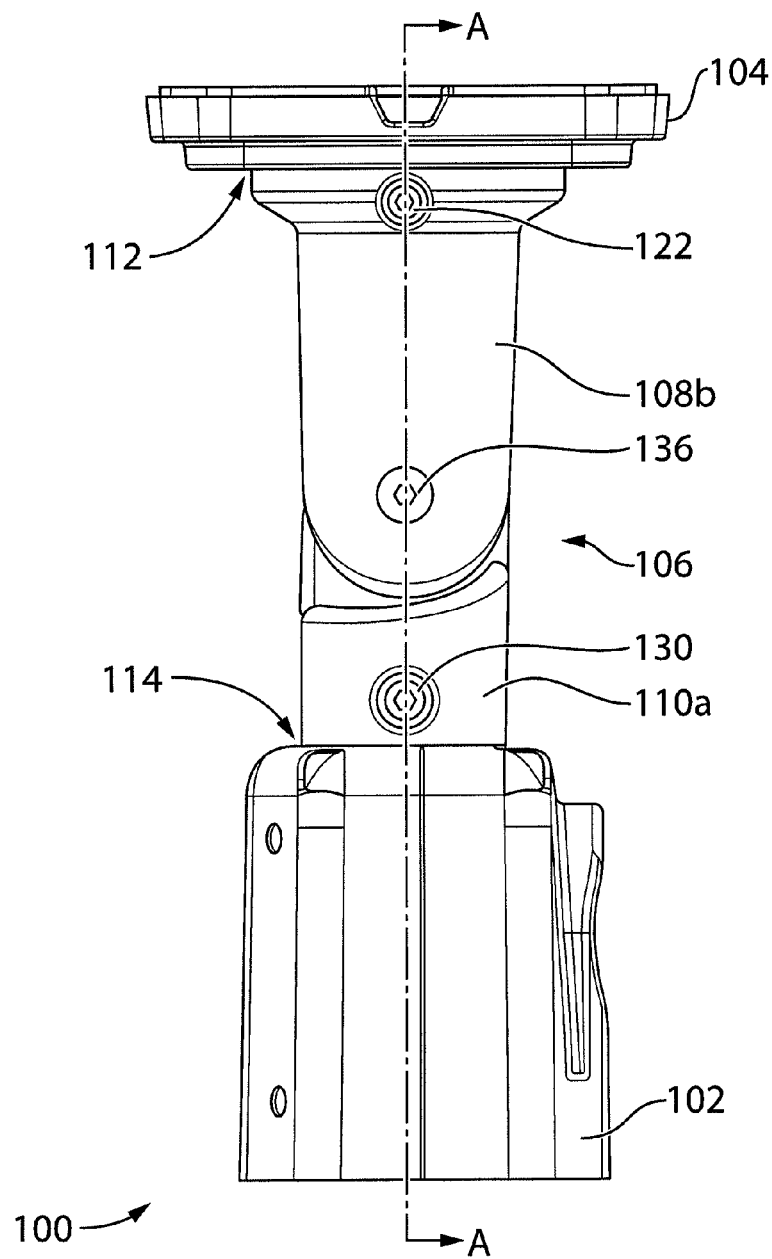
FIG. 1E is a right side elevation view of the camera assembly.

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description is intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

One way in which to mount a camera, such as a bullet camera, to a mounting surface such as a ceiling or a wall is to attach the camera to a mounting arm and to then attach the mounting arm to the mounting surface. If the mounting arm is an articulating mounting arm (hereinafter simply an "articulating arm") that has at least one degree of freedom, as in the embodiments described herein, the arm can facilitate positioning the camera at a region of interest.

More particularly, the embodiments described herein are directed at a camera assembly that comprises a camera body, an articulating arm, and a mounting plate used to mount the camera assembly to a mounting surface. The articulating arm comprises multiple sections coupled together at joints, wherein a first end of a first of the sections is coupled to the mounting plate a second end of a last of the sections is coupled to the camera body, each of the joints couples one of the sections to an immediately preceding one of the sections, and at least one of the joints is movable. The articulating arm is accordingly coupled together in series; i.e., except for the last section whose second end is connected to the camera body, the second end of any one of the sections is connected to the first end of the immediately following section. Interiors of the sections collectively comprise a wiring conduit extending through the interior of the articulating arm permitting wire to pass from the camera body to the mounting plate while entirely contained within, and accordingly protected by, the articulating arm.

FIGS. 1A-1F respectively show perspective, top plan, bottom plan, left side elevation, right side elevation, and sectional views of a camera assembly 100 comprising a camera body 102, a mounting plate 104, and an articulating arm 106 that connects the camera body 102 to the mounting plate 104. FIGS. 2A-2G respectively show perspective, right side elevation, left side elevation, top plan, bottom plan, front elevation, and rear elevation views of the articulating arm 106 in isolation. The depicted articulating arm 106 comprises two sections: a first section that is a mounting section 108, and a last section that is a camera section 110, which are hingedly coupled together at a hinge joint 132. In the camera assembly 100, the end of the mounting section 108 opposite the hinge joint 132 (i.e., the end adjacent to the mounting plate 104) is connected to the mounting plate 104 using a mounting swivel joint 112. Analogously, the end of the camera section 110 opposite the hinge joint 132 (i.e., the end adjacent to the camera section 110) is connected to the camera body 102 using a camera swivel joint 114. Assembly of the mounting and camera swivel joints 112, 114 is discussed in more detail below together with FIGS. 4 and 5. Although the depicted embodiment shows the articulating arm 106 coupled to the camera body 102 and mounting plate 104 using movable joints, in alternative embodiments (not depicted) the articulating arm 106 is fixedly coupled to one or both of the camera body 102 and mounting plate 104.

Figure 3A:
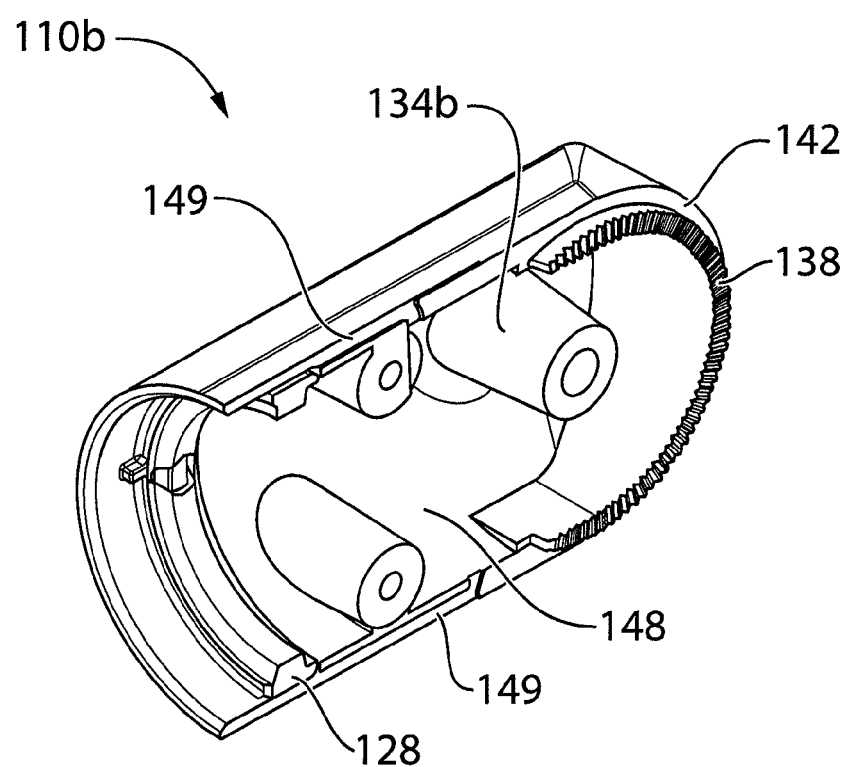
FIG. 3A is a perspective view of a long camera half of the articulating arm.
Figure 3B:
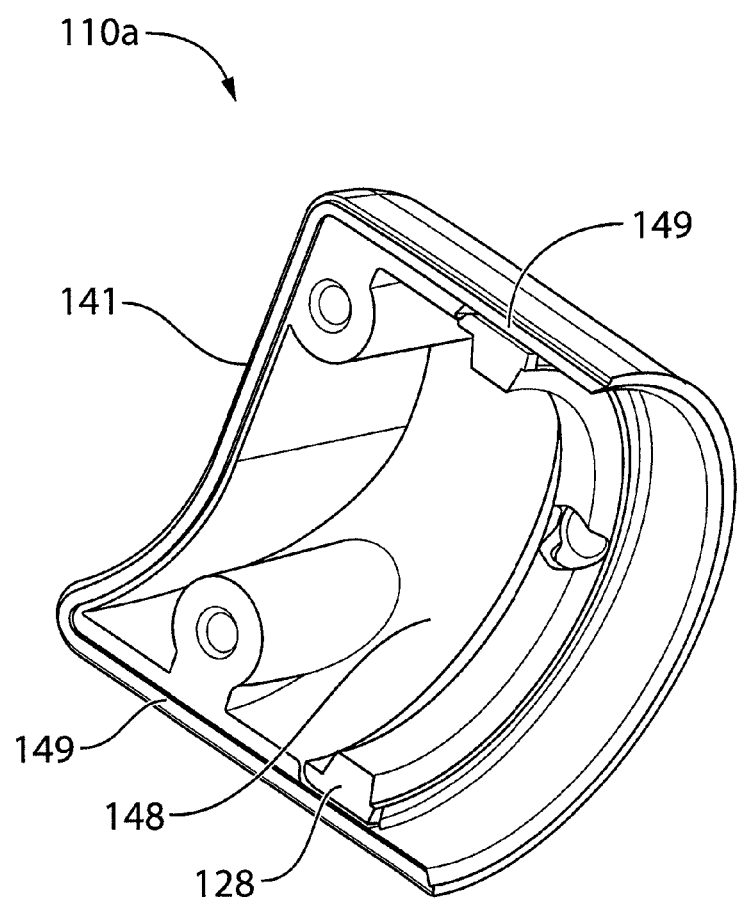
FIG. 3B is a perspective view of a short camera half of the articulating arm.
Figure 3C:
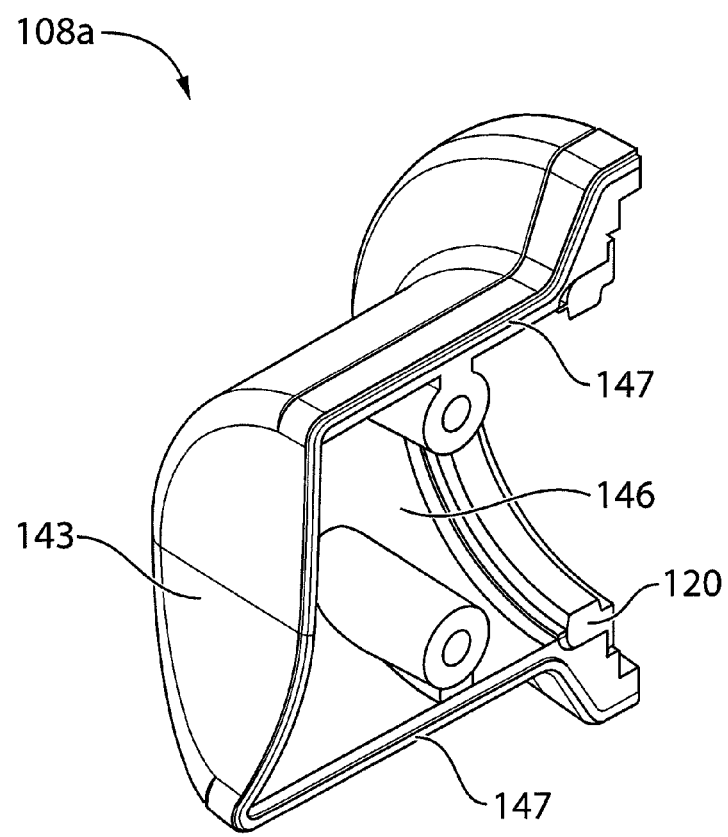
FIG. 3C is a perspective view of a short mounting half of the articulating arm.
Figure 3D:
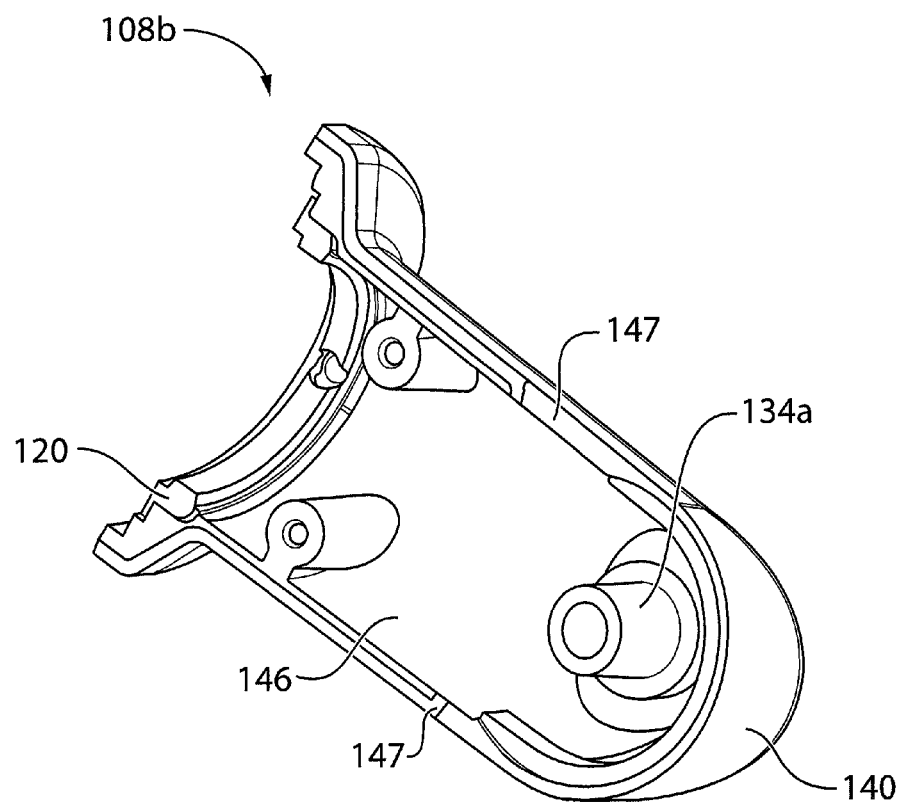
FIG. 3D is a perspective view of a long mounting half of the articulating arm.

The mounting section 108 comprises two halves of different lengths that are adjacent and fastened to each other: a short mounting half 108a and a long mounting half 108b. A perspective view of the short mounting half 108a in isolation is shown in FIG. 3C, while a perspective view of the long mounting half 108b in isolation is shown in FIG. 3D. In the depicted embodiments, each of the mounting halves 108a,b is generally semi-cylindrical and has a concave side 146, and the concave sides 146 of the mounting halves 108a,b face each other. The longitudinally extending edges 147 of each of the halves 108a,b are aligned and fastened together to form a generally hollow and cylindrical interior through which camera wiring may pass. Similarly, the camera section 110 comprises two halves of different lengths that are adjacent and fastened to each other: a short camera half 110a and a long camera half 110b. A perspective view of the short camera half 110a in isolation is shown in FIG. 3B, while a perspective view of the long camera half 110b in isolation is shown in FIG. 3A. Each of the camera halves 110a,b is generally semi-cylindrical and has a concave side 148, and the concave sides 148 of the camera halves 110a,b face each other. The longitudinally extending edges 149 of each of the halves 110a,b are aligned and fastened together to form a generally hollow and cylindrical interior through which the camera wiring may pass.

The long mounting half 108b overhangs the end of the short mounting half 108a, and the long camera half 110b similarly overhangs the end of the short camera half 110a. The mounting and camera sections 108,110 are aligned so that the concave surfaces of the overhanging portions of the long mounting and camera halves 108b,110b overlap to form a generally cylindrical interior. A rod segment extends inwardly from each of the concave surfaces of these overhanging portions (the rod segment extending from the long camera half 110b is rod segment 134b, and the rod segment extending from the long mounting half 108b is rod segment 134a). The rod segments 134a,b align to form a rod 134 into which a screw 136 is screwed through the long mounting half 108b. An end 140 of the long mounting half 108b opposite the mounting plate 104 (i.e., the end nearest the hinge joint 132) is convex, while an adjacent end 141 of the short camera half 110a is correspondingly concave to permit the long mounting half 108b to pivot about the screw 136. Similarly, an end 142 of the long camera half 110b opposite the camera body 102 (i.e., the end nearest the hinge joint 132) is convex, while the adjacent end 143 of the short mounting half 108a is correspondingly concave to permit the long camera half 110b to pivot about the screw 136. The rod 134 and screw 136 accordingly comprise the hinge joint 132, which permits the mounting section 108 and the camera section 110 to pivot relative to each other. The screw 136 can be screwed through the rod 134 and into the long camera half 110b, thus clamping the mounting and camera sections 108,110 together and preventing the mounting section 108 from pivoting relative to the camera section 110. A segment of the edge 149 of the long camera half 110b is lined with teeth 138 that contact the long mounting half 108b provide tactile feedback during pivoting of the mounting and camera sections 108,110. The teeth 138 increase the friction between the mounting and camera sections 108,110 when the two sections 108,110 are clamped together using the screw 136, thus helping to prevent unwanted movement.

Figure 2A:
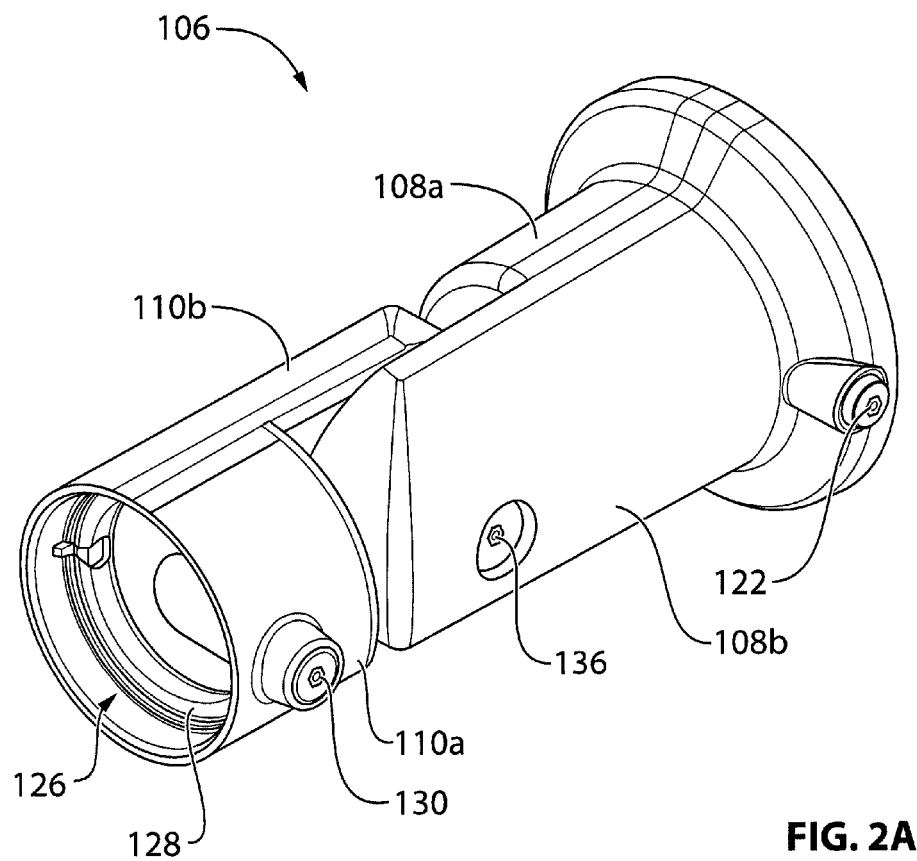
FIG. 2A is a perspective view of the articulating arm in isolation, according to another embodiment.
Figure 2B:
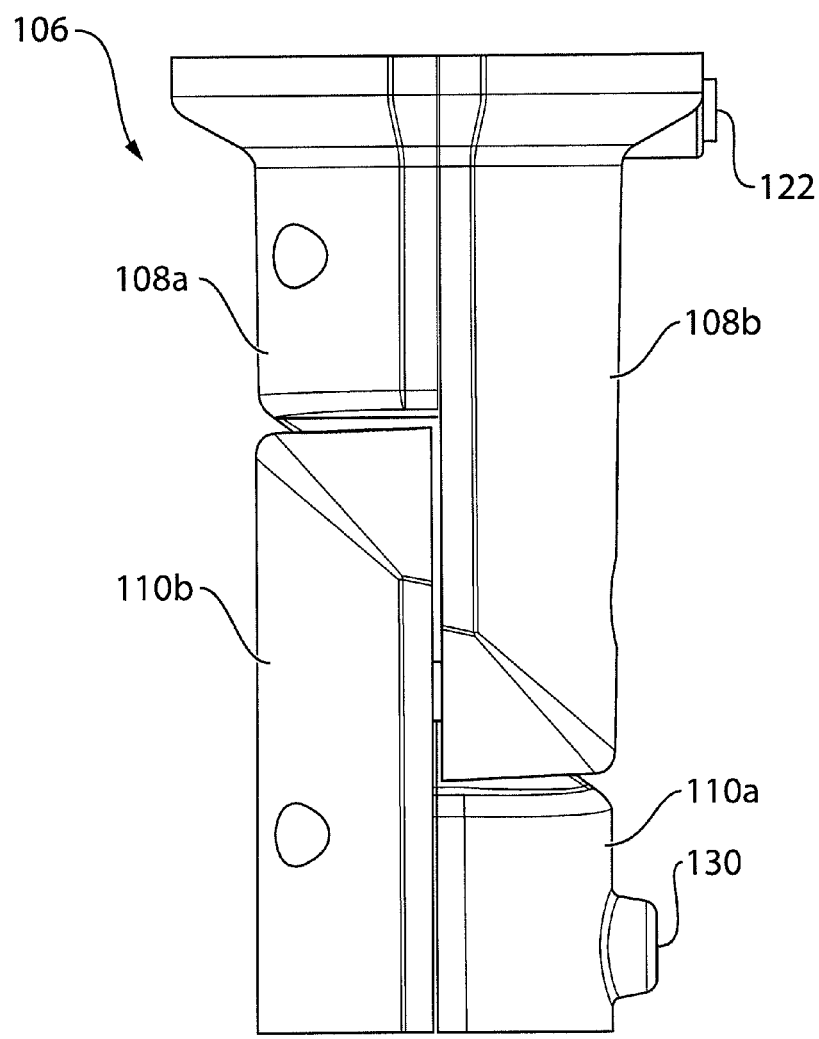
FIG. 2B is a right side elevation view of the articulating arm.
Figure 2C:
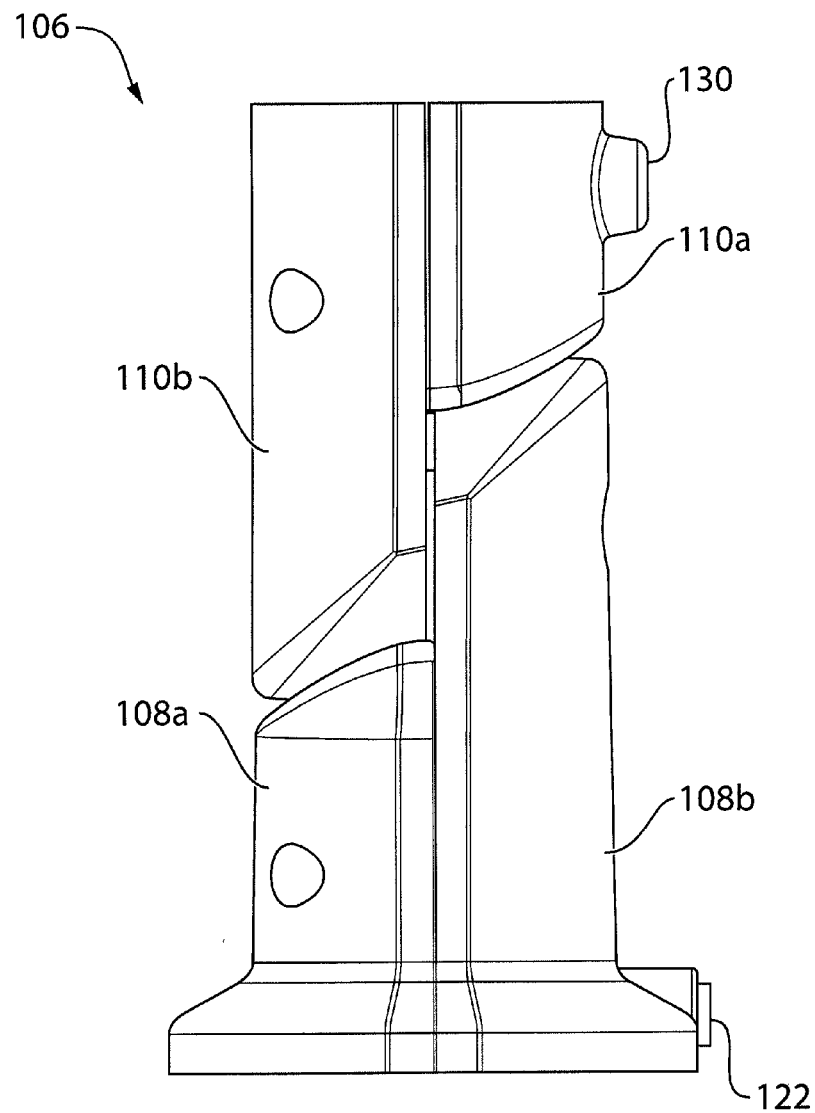
FIG. 2C is a left side elevation view of the articulating arm.
Figure 2D:
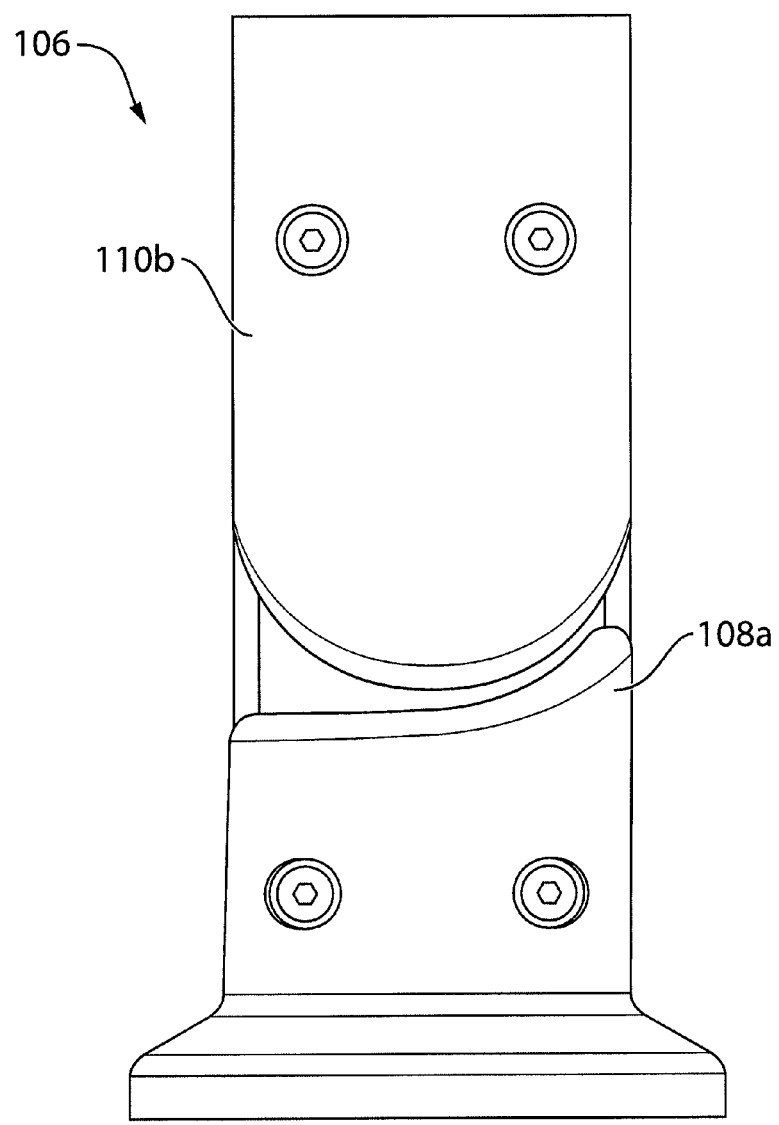
FIG. 2D is a top plan view of the articulating arm.
Figure 2E:
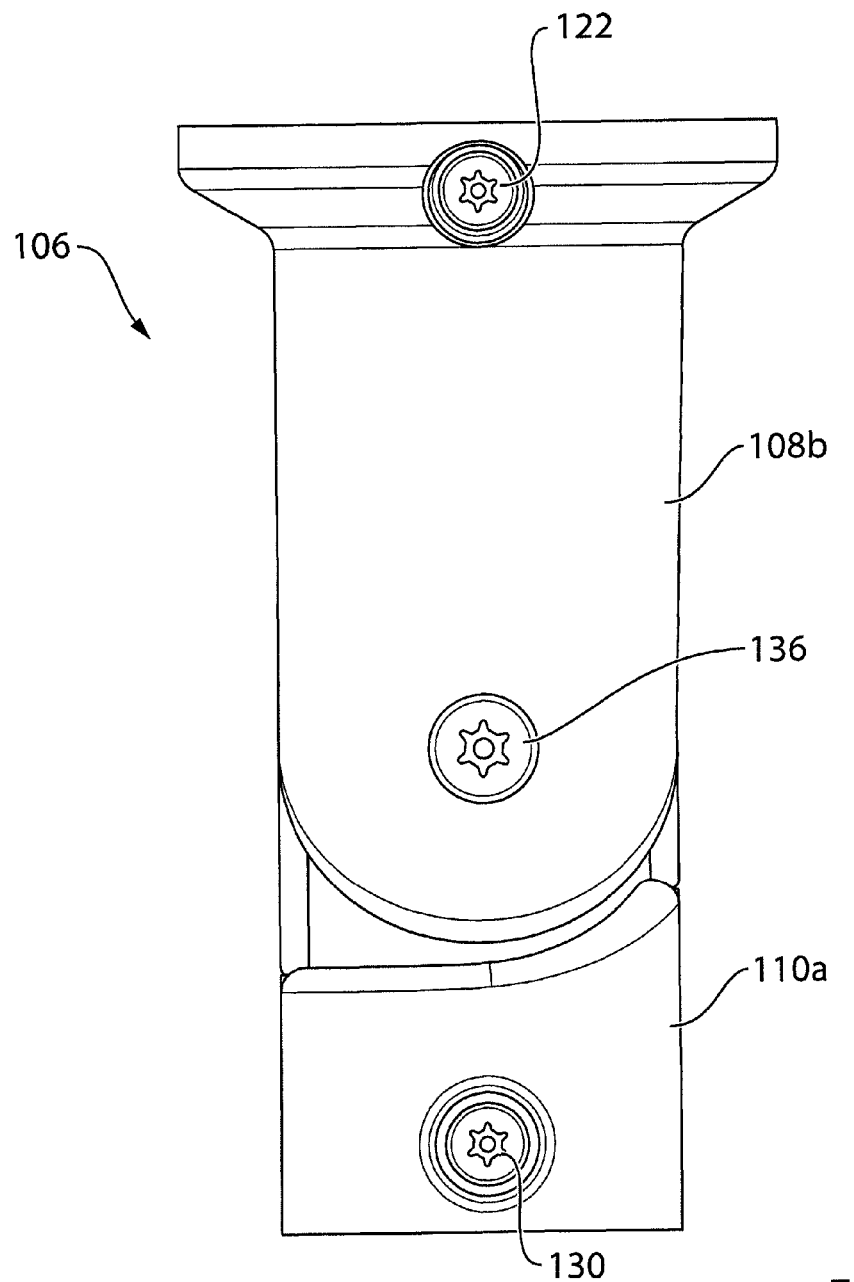
FIG. 2E is a bottom plan view of the articulating arm.
Figure 2F:
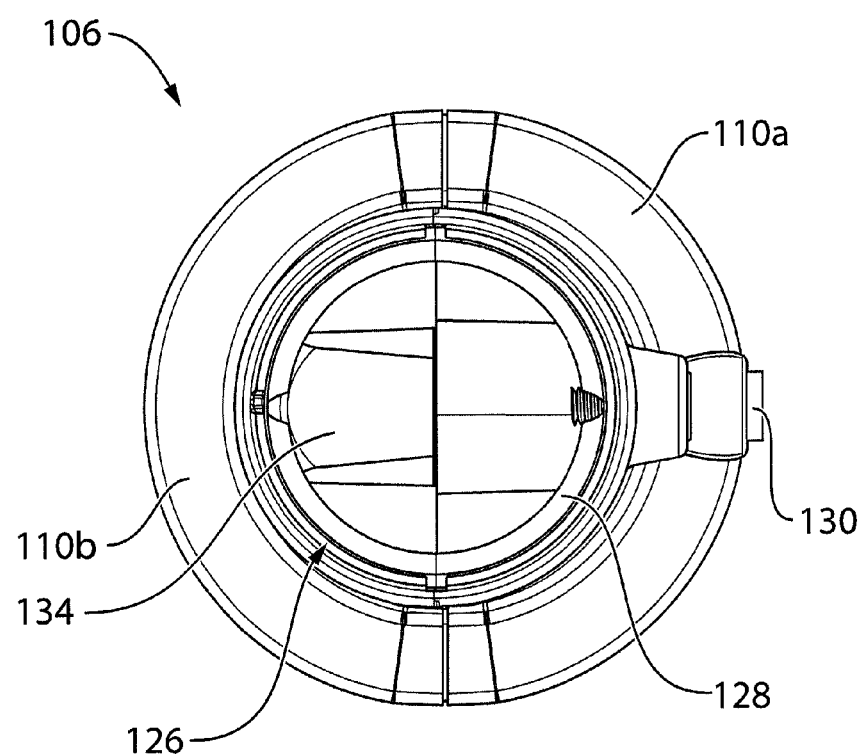
FIG. 2F is a front elevation view of the articulating arm.
Figure 2G:
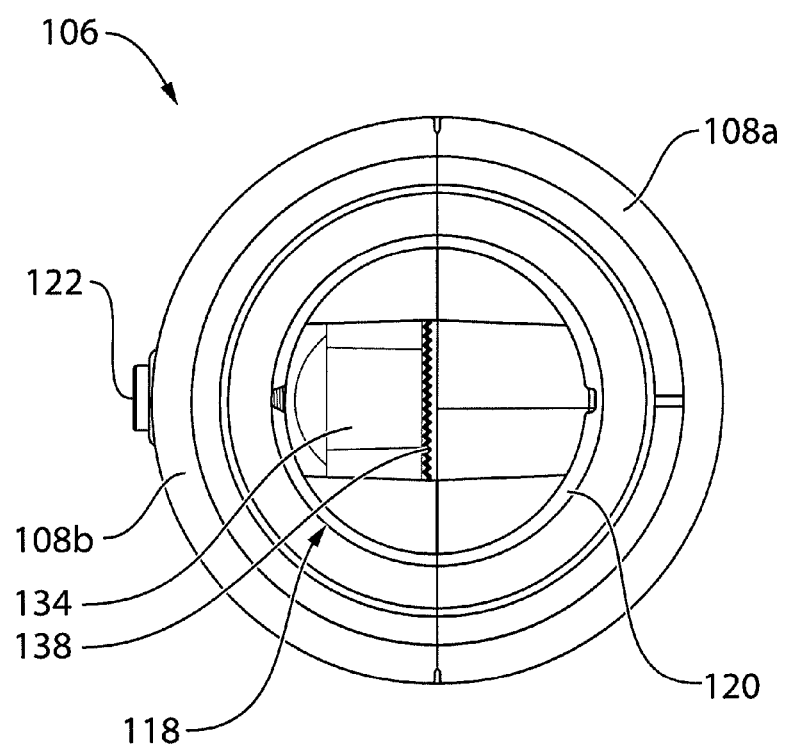
FIG. 2G is a rear elevation view of the articulating arm.
Figure 6:
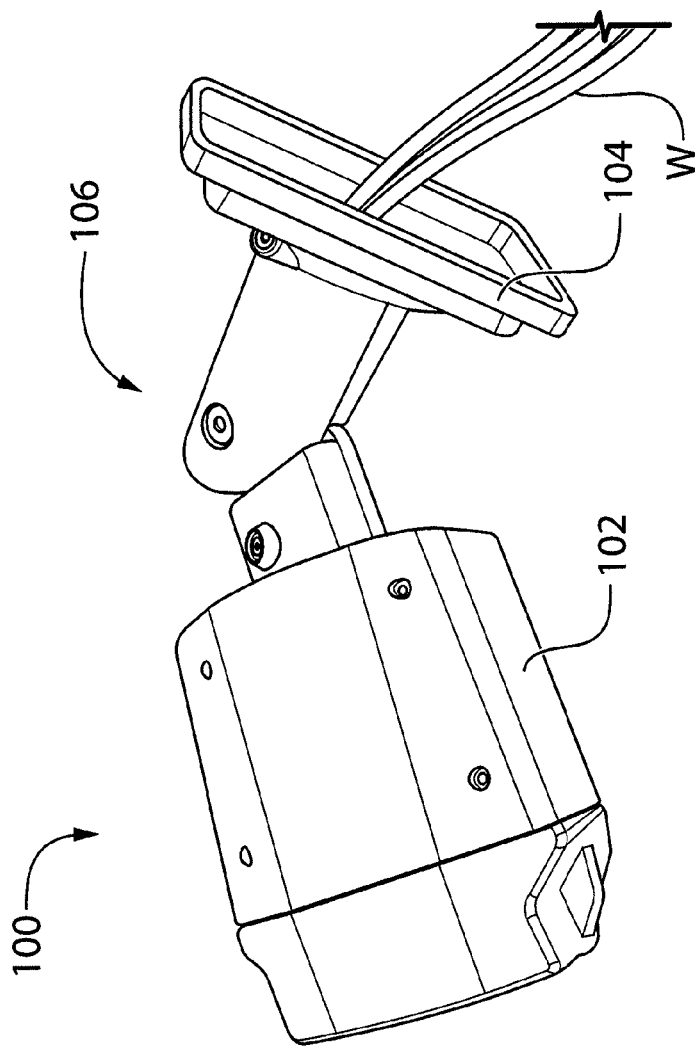
FIG. 6 is a perspective view of the camera assembly, according to another embodiment, with the articulating arm positioned differently than as shown in FIGS. 1A-1F.

The concave ends 143,141 of the short mounting half 108a and the short camera half 110a are asymmetrical to control the degree to which the mounting and camera sections 108, 110 are able to pivot with each other. Referring now to FIGS. 2D and 2E, the bottom halves of the concave ends 143,141 of the short mounting and camera halves 108a,110a are concave and follow the curvature of the adjacent long mounting and camera halves 108b,110b, respectively, whereas the top halves of those concave ends 143,141 are substantially linear and extend approximately perpendicularly to the longitudinal axis of the articulating arm 106. This allows the camera section 110 to asymmetrically pivot approximately 90° upwards but only approximately 45° downwards. FIG. 6, which is discussed in more detail below, shows the camera section 110 bent at approximately 45°.

Figure 1F:
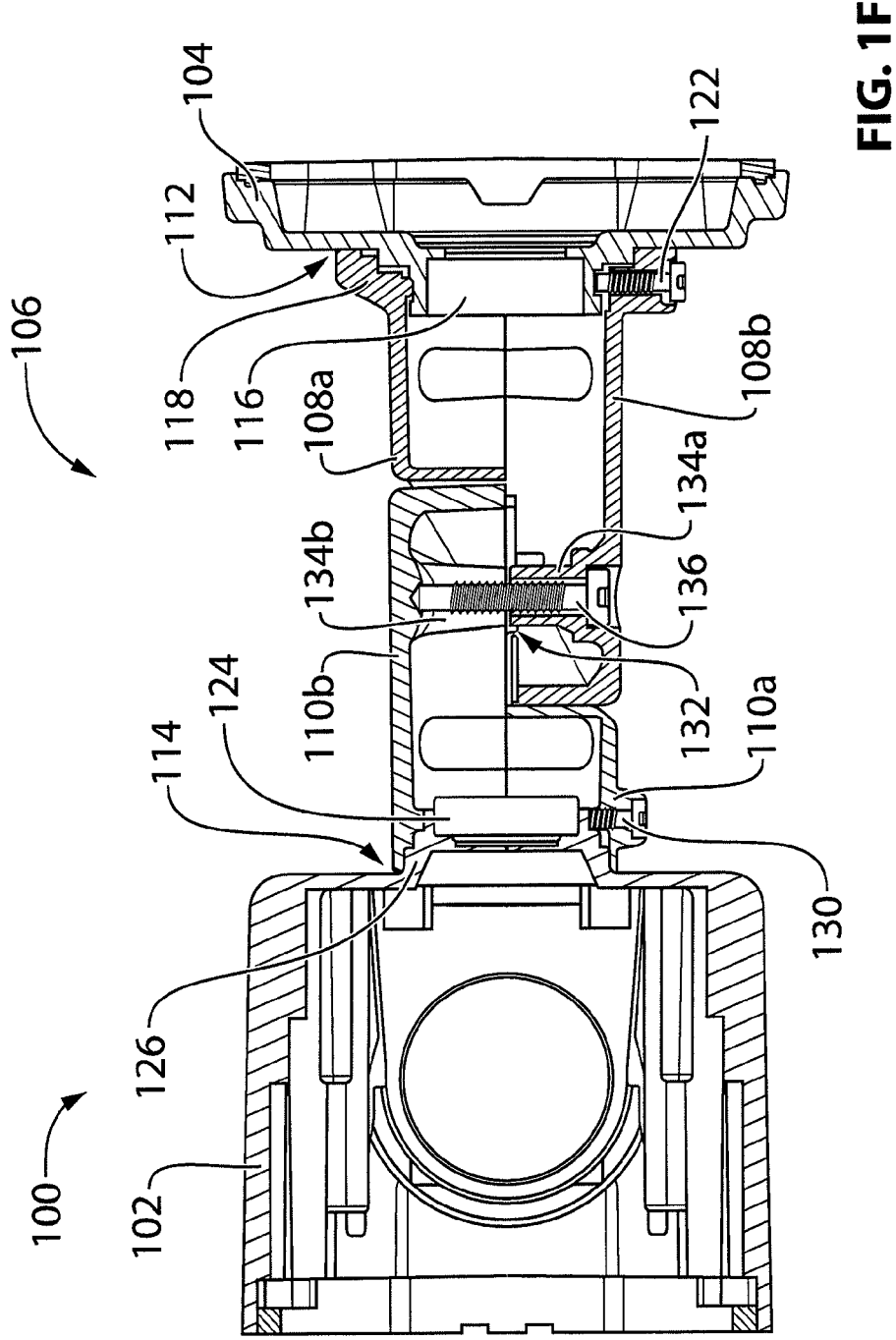
FIG. 1F is a sectional view of the camera assembly taken along line A-A of FIG. 1E.
Figure 5:
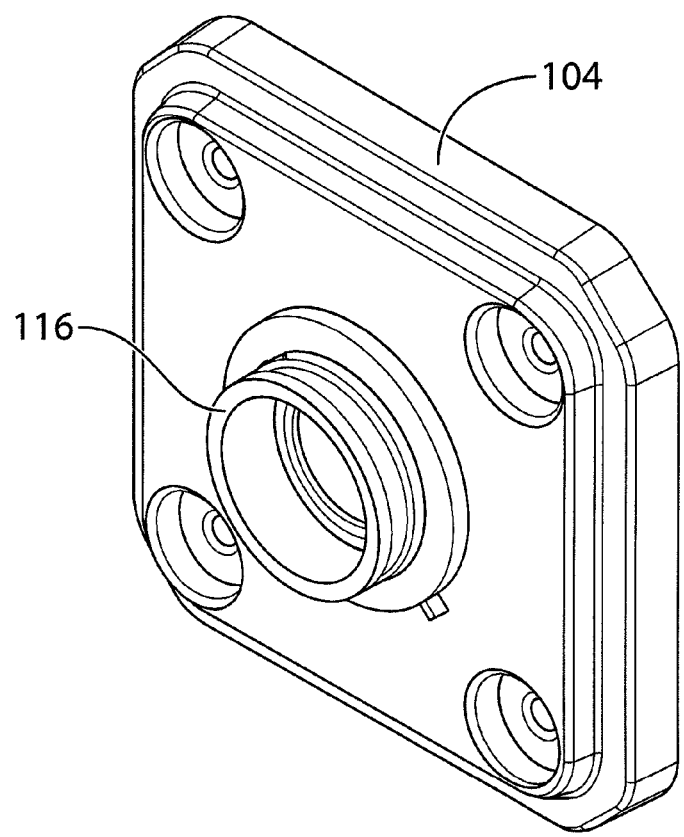
FIG. 5 is a perspective view of the mounting plate in isolation, according to another embodiment.

Referring now in particular to FIGS. 1F and 5, the mounting swivel joint 112 comprises a cylindrical first male portion 116 that extends from the mounting plate 104 and a cylindrical first female portion 118 that is at the base of the articulating arm 106. The short mounting half 108a comprises one half of the first female portion 118, while the long mounting half 108b comprises the other half of the first female portion 118. The first female portion 118 comprises a first ridge 117 that is shaped to mate with a first groove 119 that circumscribes the first male portion 116. A first bushing 120 is located between the first ridge 117 and groove 119 to facilitate rotation of the first male and female portions 116,118, which permits the articulating arm 106 to be swiveled relative to the mounting plate 104. A first set screw 122 extends through the long mounting half 108b and first bushing 120 and can be screwed against the first male portion 116, thus preventing swiveling of the mounting plate 104 relative to the articulating arm 106.

Figure 4:
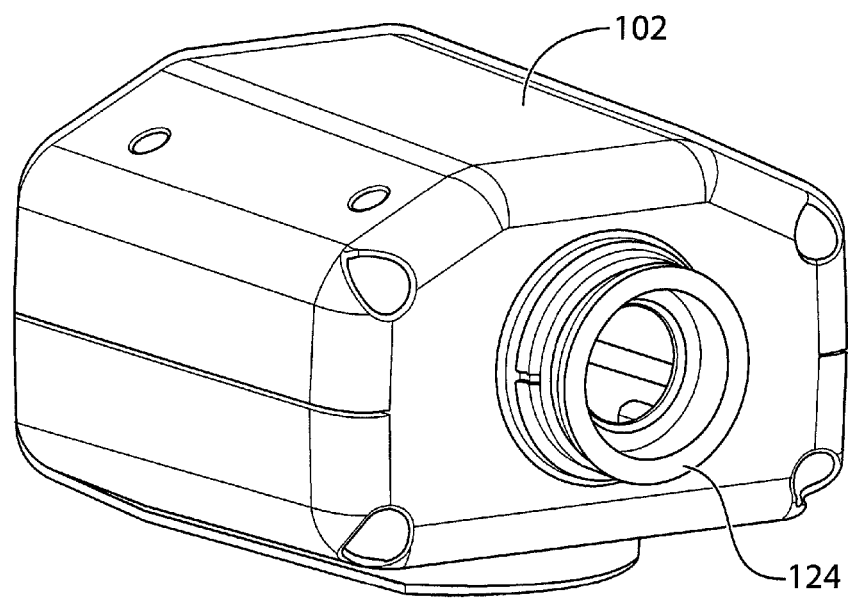
FIG. 4 is a perspective view of the camera body in isolation, according to another embodiment.

Analogously, and referring now in particular to FIGS. 1F and 4, the camera swivel joint 114 comprises a cylindrical second male portion 124 that extends from the rear surface of the camera body 102 and a cylindrical second female portion 126 that is at the end of the articulating arm 106 adjacent the camera body 102. The short camera half 110a comprises one half of the second female portion 126, while the long camera half 110b comprises the other half of the second female portion 126. The second female portion 126 comprises a second ridge 127 that is shaped to mate with a second groove 129 that circumscribes the second male portion 124. A second bushing 128 is located between the second ridge 127 and groove 129 to facilitate rotation of the second male and female portions 124,126, which permits the articulating arm 106 to be swiveled relative to the camera body 102. A second set screw 130 extends through the short camera half 110a and second bushing 128 and can be screwed against the second male portion 124, thus preventing swiveling of the camera body 102 relative to the articulating arm 106.

When the camera assembly 100 is in use, the wiring W used to power and communicate with the camera (shown leaving the mounting plate 104 in FIG. 6) passes from the camera body 102, through the articulating arm 106, and out through the mounting plate 104. Consequently, the wiring W is protected by the articulating arm 106 from tampering by third parties and from environmental damage. More specifically, the wiring W extends through from the camera body 102, through the second male portion 124 and into the long camera half 110b, past the hinge joint 132, into the long mounting half 108b, through the first male portion 116 and out through the back of the mounting plate 104. This permits the articulating arm 106 to be positioned as desired without straining the wiring W.

Referring now to FIG. 6, the camera assembly 100 is shown with the articulating arm 106 differently positioned than it is in FIGS. 1A-1F. In FIG. 6, the mounting swivel joint 112 has been rotated approximately 45°, the camera swivel joint 114 has been rotated approximately 90°, and the hinge joint 132 has been rotated approximately 45°. The articulating arm 106 may be positioned differently than as depicted. For example, in one alternative embodiment the hinge joint 132 is rotated approximately 90° in a direction opposite that shown in FIG. 6.

The depicted articulating arm 106 has three degrees of freedom, with the arm 106 being swivelable relative to each of the camera body 102 and mounting plate 104, and with the mounting and camera sections 108,110 of the arm 106 being pivotable relative to each other. In other embodiments (not depicted), the arm 106 may be articulated differently. For example, one of both of the swivel joints 112,114 may be replaced with a hinge or different type of joint, while the hinge joint 132 may be replaced with a swivel or different type of joint. For example, in some of these embodiments some of the sections of the arm 106 may be fixedly coupled together using non-movable joints, while some other sections of the arm 106 are coupled together using movable joints. Furthermore, in alternative embodiments (not depicted) the arm 106 may have one, two, or more than three degrees of freedom. For example, the arm 106 may be lengthened to comprise additional sections each independently articulable from the mounting and camera sections 108,110.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A camera assembly, comprising:
   (a) a mounting plate;
   (b) a camera body; and
   (c) an articulating arm comprising multiple sections coupled together in series at joints of which at least one is movable, wherein each of the joints couples one of the sections to an immediately preceding one of the sections, a first end of a first of the sections ("mounting section") is coupled to the mounting plate at a movable mounting joint, and a second end of a last of the sections ("camera section") is coupled to the camera body at a movable camera joint,
   wherein interiors of the sections collectively comprise a wiring conduit extending through the interior of the articulating arm permitting wire to pass from the camera body to the mounting plate while entirely contained within the articulating arm,
   wherein one of the sections ("first pivot arm section") comprises a first shorter portion and a first longer portion that overhangs the first shorter portion, the first portions connected along their longitudinally extending edges,
   wherein another of the sections ("second pivot arm section") is directly and pivotably coupled to the first pivot arm section and comprises a second shorter portion and a second longer portion that overhangs the second shorter portion, the second portions connected along their longitudinally extending edges, and
   wherein overhanging portions of the first and second longer portions overlap each other.

2. The camera assembly of claim 1 wherein all of the joints are movable.

3. The camera assembly of claim 1 wherein the mounting joint comprises a mounting swivel joint and the camera joint comprises a camera swivel joint, and wherein the first pivot arm section is the mounting section and the second pivot arm section is the camera section.

4. The camera assembly of claim 3 wherein the mounting swivel joint comprises:
   (a) a cylindrical first female portion comprising part of one of the mounting section and mounting plate; and
   (b) a cylindrical first male portion, nested within the first female portion, extending from the other of the mounting section and mounting plate; and
   wherein the camera swivel joint comprises:
   (c) a cylindrical second female portion comprising part of one of the camera section and camera body; and
   (d) a cylindrical second male portion, nested within the second female portion, extending from the other of the camera section and camera body.

5. The camera assembly of claim 4 wherein the wiring conduit extends through the interior of the cylindrical first and second male portions.

6. The camera assembly of claim 3 wherein the first portions comprise complementary halves of the first pivot arm section and have opposing concave sides and wherein the second portions comprise complementary halves of the second pivot arm section and have opposing concave sides.

7. The camera assembly of claim 6 wherein the wiring conduit extends through the overhanging portions of the first and second longer portions.

8. The camera assembly of claim 6 further comprising a hinge joint joining the pivot arm sections that extends through the overhanging portions of the first and second longer portions.

9. The camera assembly of claim 8 wherein the hinge joint comprises:
   (a) a rod formed from an aligned pair of rod segments, one of which extends from the first longer portion and the other of which extends from the second longer portion; and
   (b) a screw that is screwed into the rod.

10. The camera assembly of claim 8 wherein ends of the first and second longer portions nearest the hinge joint each comprises a convex portion to permit pivoting of the first pivot arm section relative to the second pivot arm section.

11. The camera assembly of claim 10 wherein ends of the first and second shorter portions each comprises a linear portion extending transverse to the longitudinal axis of the articulating arm and a concave portion shaped to receive the convex portions of the second and first longer portions, respectively, to permit asymmetrical pivoting of the first pivot arm section relative to the second pivot arm section.

12. The camera assembly of claim 6 wherein one of the overhanging portions of the first and second longer portions comprises teeth that contact the other of the overhanging portions.

13. An articulating arm for mounting a camera to a mounting surface, the arm comprising multiple sections coupled together in series at joints of which at least one is movable, wherein each of the joints couples one of the sections to an immediately preceding one of the sections, and wherein:
   (a) a first end of a first of the sections ("mounting section") comprises a male or female portion of a mounting swivel joint;
   (b) a second end of a last of the sections ("camera section") comprises a male or female portion of a camera swivel joint;
   (c) interiors of the sections collectively comprise a wiring conduit extending through the interior of the articulating arm permitting wire to pass from the second end of the camera section to the first end of the mounting section while entirely contained within the articulating arm;

(d) one of the sections ("first pivot arm section") comprises a first shorter portion and a first longer portion that overhangs the first shorter portion, the first portions connected along their longitudinally extending edges;

(e) another of the sections ("second pivot arm section") is directly and pivotably coupled to the first pivot arm section and comprises a second shorter portion and a second longer portion that overhangs the second shorter portion, the second portions connected along their longitudinally extending edges; and (f) overhanging portions of the first and second longer portions overlap each other.

14. The arm of claim 13 wherein all of the joints are movable.

15. The arm of claim 13 wherein the first pivot arm section is the mounting section and the second pivot arm section is the camera section.

16. The arm of claim 15 wherein the first portions comprise complementary halves of the first pivot arm section and have opposing concave sides and wherein the second portions comprise complementary halves of the second pivot arm section and have opposing concave sides.

17. The arm of claim 16 wherein the wiring conduit extends through the overhanging portions of the first and second longer portions.

18. The arm of claim 16 wherein one of the overhanging portions of the first and second longer portions comprises teeth that contact the other of the overhanging portions.

19. The arm of claim 16 further comprising a hinge joint joining the pivot arm sections that extends through the overhanging portions of the first and second longer portions.

20. The arm of claim 19 wherein the hinge joint comprises:
(a) a rod formed from an aligned pair of rod segments, one of which extends from the first longer portion and the other of which extends from the second longer portion; and
(b) a screw that is screwed into the rod.

21. The arm of claim 19 wherein ends of the first and second longer portions nearest the hinge joint each comprises a convex portion to permit pivoting of the first pivot arm section relative to the second pivot arm section.

22. The arm of claim 21 wherein ends of the first and second shorter portions each comprises a linear portion extending transverse to the longitudinal axis of the articulating arm and a concave portion shaped to receive the convex portions of the second and first longer portions, respectively, to permit asymmetrical pivoting of the first pivot arm section relative to the second pivot arm section.

* * * * *